United States Patent
Jones et al.

(10) Patent No.: US 10,229,699 B2
(45) Date of Patent: Mar. 12, 2019

(54) SYSTEMS AND METHODS OF TRACKING ITEM CONTAINERS AT A SHOPPING FACILITY

(71) Applicant: Walmart Apollo, LLC, Bentonville, AR (US)

(72) Inventors: Nicholaus A. Jones, Fayetteville, AR (US); Matthew A. Jones, Bentonville, AR (US); Robert J. Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 48 days.

(21) Appl. No.: 15/364,881

(22) Filed: Nov. 30, 2016

(65) Prior Publication Data
US 2017/0162215 A1    Jun. 8, 2017

Related U.S. Application Data

(60) Provisional application No. 62/261,988, filed on Dec. 2, 2015.

(51) Int. Cl.
*H04R 29/00*    (2006.01)
*G10L 25/51*    (2013.01)
*G06Q 10/08*    (2012.01)

(52) U.S. Cl.
CPC ............ *G10L 25/51* (2013.01); *G06Q 10/087* (2013.01)

(58) Field of Classification Search
CPC ........ H04H 20/04; H04H 20/38; H04H 20/57; H04H 20/61; H04H 20/63; H04H 20/72;
(Continued)

(56) References Cited

U.S. PATENT DOCUMENTS

| | | | | |
|---|---|---|---|---|
| 4,576,274 A | * | 3/1986 | Thorsen | A47F 10/04 186/62 |
| 4,868,544 A | | 9/1989 | Havens | |

(Continued)

OTHER PUBLICATIONS

PCT; App. No. PCT/US2016/063974; International Search Report and Written Opinion dated Feb. 3, 2017.
(Continued)

*Primary Examiner* — Lao Lun-See
(74) *Attorney, Agent, or Firm* — Fitch, Even, Tabin & Flannery LLP (57) ABSTRACT

In some embodiments, provide apparatuses and methods to track item containers. Some of these embodiments include systems to track item containers, comprising: an audio detector positioned relative to a parking lot associated with a shopping facility and configured to capture audio signals generated at one or more predefined locations; an audio evaluation circuit to: receive the audio signals; and identify when one or more audio signatures correspond to one or more distinct predefined audio signatures that correspond to movements of a first item container relative to the one or more predefined locations; and a control circuit configured to estimate a quantity of item containers at the one or more predefined locations as a function of identifying that one or more of the audio signals include the one or more audio signatures corresponding to the one or more predefined audio signatures.

20 Claims, 2 Drawing Sheets

(58) Field of Classification Search
CPC ........ H04H 40/27; H04H 60/07; H04H 60/15;
H04H 60/16; H04H 60/22; H04H 60/23;
H04H 60/33; H04H 60/48; H04H 60/70;
H04W 4/028; H04W 4/185; H04W
84/042; H04W 12/06; H04W 88/02;
H04W 4/02; H04W 12/06; H04W 4/043;
H04R 5/033; G10L 25/51
USPC ......... 381/55–58; 340/540; 701/400; 700/94
See application file for complete search history.

(56) References Cited

U.S. PATENT DOCUMENTS

| | | |
|---|---|---|
| 5,119,087 A | 6/1992 | Lucas |
| 5,283,550 A | 2/1994 | MacIntyre |
| 5,526,433 A | 6/1996 | Zakarauskas |
| 5,834,706 A | 11/1998 | Christ |
| 6,026,686 A | 2/2000 | Hattori |
| 6,206,165 B1 | 3/2001 | Lenander |
| 6,378,684 B1 | 4/2002 | Cox |
| 6,486,768 B1 | 11/2002 | French |
| 6,867,694 B2 | 3/2005 | Wieth |
| 7,579,967 B2 | 8/2009 | Wieth |
| 7,746,379 B2 | 6/2010 | Jesson |
| 8,046,160 B2 | 10/2011 | Carter |
| 8,188,863 B2 | 5/2012 | Rinkes |
| 8,406,993 B2 * | 3/2013 | Hannah .................. A47F 10/04 340/505 |
| 8,433,507 B2 * | 4/2013 | Hannah .................. A47F 10/04 340/505 |
| 8,477,032 B2 | 7/2013 | Bergman |
| 9,104,205 B1 | 8/2015 | Caver |
| 10,064,502 B1 * | 9/2018 | Gyori ........................ A47F 5/16 |
| 2002/0167403 A1 | 11/2002 | Colmenarez |
| 2004/0193466 A1 | 9/2004 | Kull |
| 2006/0103530 A1 | 5/2006 | Prather |
| 2007/0282716 A1 | 12/2007 | Branigan |
| 2008/0136623 A1 | 6/2008 | Calvarese |
| 2010/0176922 A1 | 7/2010 | Schwab |
| 2013/0233922 A1 | 9/2013 | Schoening |
| 2013/0290018 A1 | 10/2013 | Anderson |
| 2014/0035726 A1 * | 2/2014 | Schoner ............. G06K 7/10366 340/8.1 |
| 2014/0167960 A1 * | 6/2014 | Argue .................. B07C 5/3422 340/540 |
| 2015/0046229 A1 | 2/2015 | Gollu |
| 2016/0292933 A1 | 10/2016 | Sprock |
| 2017/0180925 A1 | 6/2017 | Taylor |
| 2017/0186124 A1 | 6/2017 | Jones |

OTHER PUBLICATIONS

USPTO; U.S. Appl. No. 15/366,201; Notice of Allowance dated Dec. 20, 2017; (pp. 1-8).

* cited by examiner

SYSTEMS AND METHODS OF TRACKING ITEM CONTAINERS AT A SHOPPING FACILITY

CROSS-REFERENCE TO RELATED APPLICATION

This application claims the benefit of U.S. Provisional Application No. 62/261,988, filed Dec. 2, 2015, which is incorporated herein by reference in its entirety. This invention relates generally to tracking item containers at a shopping facility.

TECHNICAL FIELD

This invention relates generally to tracking item containers at a shopping facility.

BACKGROUND

In modern retail environments, there is a need to improve the customer experience. Part of the customer experience is the convenience to customer. Further, the customer experience at the shopping facility can have significant effects on current sales. Providing a pleasant or improved customer experience can lead to customer satisfaction and repeat returns to the shopping location.

There are many ways to improve customer experience. For example, ready access to products and convenience to collecting products can lead to increased customer visits and customer loyalty. The shopping facility can affect customer experience based in part on finding products of interest, access to a shopping facility, and/or congestion within the shopping facility. Accordingly, it can be advantageous to improve the customers' shopping experience.

BRIEF DESCRIPTION OF THE DRAWINGS

Disclosed herein are embodiments of systems, apparatuses and methods to track item containers. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some application", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses, methods and processes are provided to track the location of item containers (e.g., shopping carts, flatbed carts, platform carts or trucks, panel carts or trucks, bins, baskets, and other such item containers) as they are moved relative to a shopping facility, and particularly as they are transported to various locations of an exterior of a shopping facility, such as in the parking lot associated with and/or adjacent to a shopping facility. The shopping facility may be any type of shopping facility at a location in which products displayed and/or for sale are variously distributed throughout the shopping facility space through which customers travel to retrieve desired products. The shopping facility may be a retail sales facility, or any other type of facility in which products are displayed and/or sold. The facility may be any size of format facility, and may include products from one or more merchants. For example, a facility may be a single store operated by one merchant or may be a collection of stores covering multiple merchants such as a mall.

Some embodiments provide systems and/or methods to track item containers, and include one or more audio detectors positioned relative to a parking lot associated with a shopping facility and/or other area where item containers are to be tracked. The audio detector is configured to capture audio signals generated at one or more predefined locations of the parking lot or other area. The system further includes one or more audio evaluation circuits that receive, over time, the audio signals captured by the audio detector. The audio evaluation circuit and/or a control circuit can further identify, for each of the audio signals, when the audio signal includes one or more audio signatures corresponding to one or more distinct predefined audio signatures and/or prerecorded audio signatures that correspond to movements of one or more item containers relative to the one or more predefined locations of the parking lot. Some embodiments further include one or more control circuits that are coupled with the audio evaluation circuit. The control circuit estimates a quantity of item containers at the one or more predefined locations as a function of identifying that one or more of the audio signals include one or more audio signatures corresponding to the one or more predefined and/or prerecorded audio signatures.

Often, shopping facilities typically do not have a systematic method of identifying a number of item containers being used by customers, versus item containers available for customers and/or item containers that have been removed from the shopping facility and awaiting pickup by workers at the shopping facility. Further, shopping facilities typically do not have a systematic way of determine when to retrieve item containers from the parking lot and/or other areas outside of the shopping facility. The present embodiments, however, provide systems and methods to track item containers, and identify when item containers should be retrieved.

Figure 1:
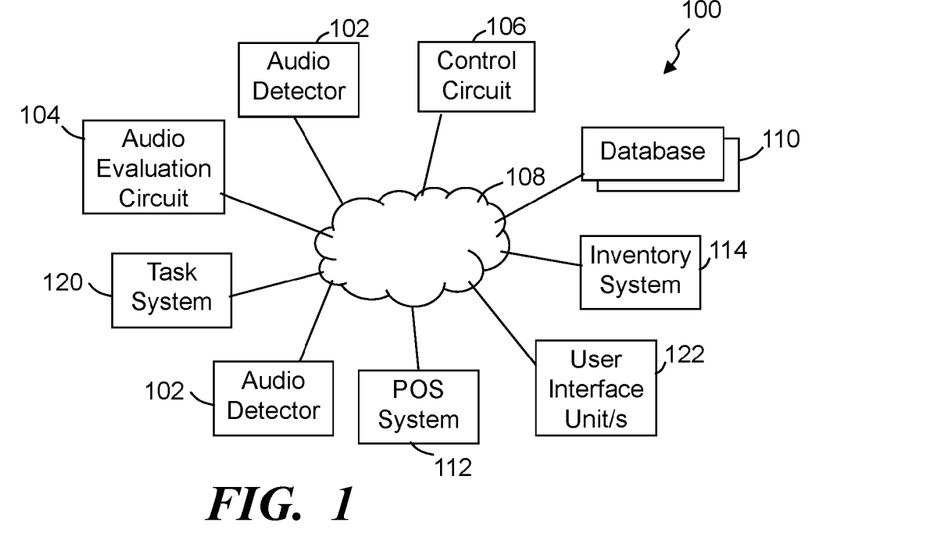
FIG. 1 illustrates a simplified block diagram of an exemplary item container tracking system corresponding to a shopping facility, in accordance with some embodiments.

FIG. 1 illustrates a simplified block diagram of an exemplary item container tracking system 100 corresponding to a shopping facility, in accordance with some embodiments. The system includes one or more audio detectors 102, one or more audio evaluation circuits and/or systems 104, and a central or system control circuit 106 that is communicatively coupled with at least the audio evaluation circuit 104 and typically further communicatively coupled with the audio detector 102 through one or more wired and/or wireless distributed communication networks 108 (e.g., LAN, WAN, Internet, etc.). The system typically further includes one or more databases 110 and/or other electronic data storage components, which may store predefined and/or prerecorded audio signatures, item container counts, item container identifier information, sales information, product information, and/or other such information. In some embodiments, the system may optionally include and/or communicatively couple with one or more point-of-sale (POS) systems 112, one or more inventory systems 114, one or more task systems 120, user interface units 122 and other relevant systems. It is noted that at least the control circuit 106 and the audio evaluation circuit 104 are illustrated as separate circuits. However, in some embodiments some or all of the audio evaluation circuit 104 may be implemented in the control circuit 106. Similarly, some or all of the functionality of one or more of the task system 120, inventory system 114, and POS systems 112 can be cooperated and implemented into one or more systems, and in some instances some or all of the functionality may be as part of the control circuit 106.

Figure 2:
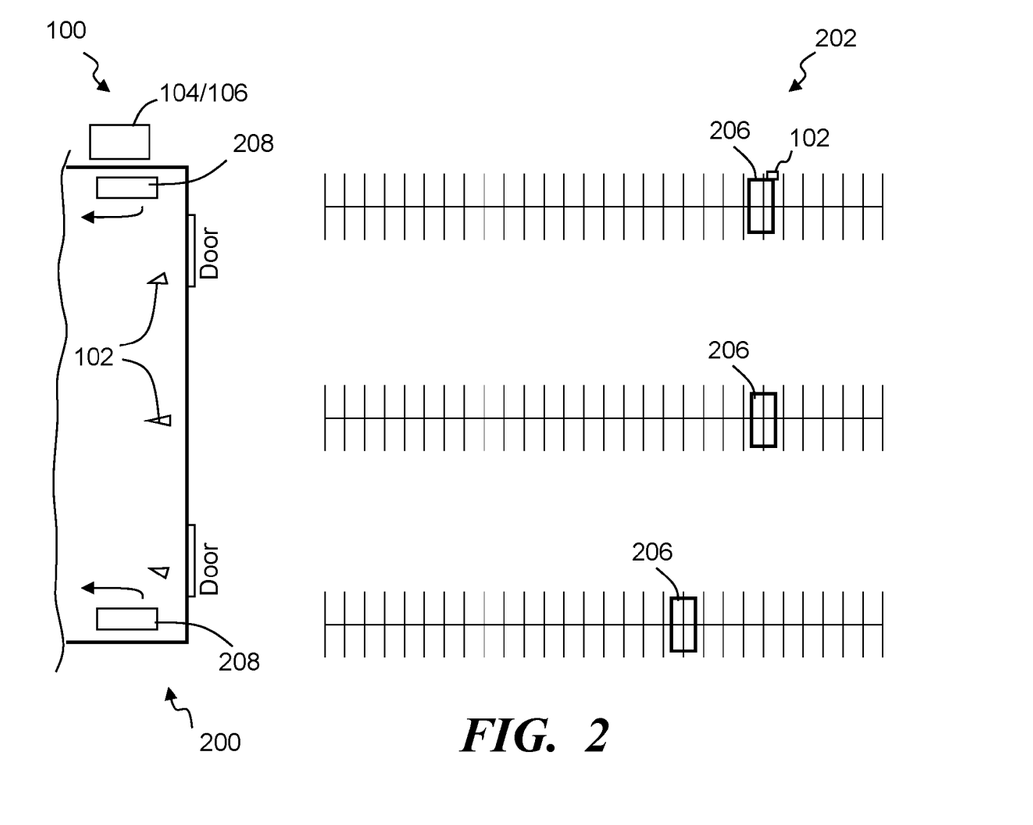
FIG. 2 illustrates a simplified block diagram, overhead view of an exemplary shopping facility and an item container tracking system, in accordance with some embodiments.

FIG. 2 illustrates a simplified block diagram, overhead view of an exemplary shopping facility 200 and an item container tracking system 100, in accordance with some embodiments. The shopping facility includes and/or is associated with a parking lot 202. One or more predefined locations 206 and 208 are defined. The predefined locations can include substantially any relevant location where an item container is typically intended to be placed and/or may be placed (e.g., a cart corral 206, cart staging area 208 proximate the entrance to the shopping facility 200). The one or more audio detectors are positioned to detect audio signals from one or more of the predefined locations. For example, an audio detector may be positioned at a cart corral. Additionally or alternatively, an audio detector may be on a roof of the shopping facility and aimed to receive audio signals corresponding to one or more predefined locations. The one or more control circuits 106 and one or more audio evaluation circuits 104 are in communication with each other. Further, the audio detectors 102 are in wired and/or wireless communication with the audio evaluation circuit and/or control circuit.

Referring to FIGS. 1-2, the one or more audio detectors 102 and/or detector systems are positioned at one or more locations at the shopping facility to detect sounds at least generated by the movement of item containers. For example, one or more audio detectors may be positioned on a roof of the shopping facility and directed to capture audio sounds over a predefined location comprising an area associated with the shopping facility. The size of the predefined location typically depends on the type of audio detector utilized and its placement relative to the predefined from which sounds are trying to be detected.

In some applications, the one or more audio detectors can include one or more microphones, parabolic microphones, directional microphones, antennas, other such audio detectors, or combination of two or more of such detectors. For example, one or more audio detectors may include an array of multiple microphones positioned to detect audio signals generated from one or more predefined locations associated with the shopping facility. The audio detectors can be mounted proximate a parking lot of the shopping facility and can detect noises, including noises generated when an item container is moved relative to a particular predefined location. For example, an audio detector may include a directional microphone or antenna mounted at a distance from the one or more predefined locations of the parking lot and directed at a first predefined location, of the one or more predefined locations where item containers are deposited, to capture at least some of the audio signals generated at the first predefined location. In some instances, one or more parabolic microphone can be positioned on a roof of the shopping facility, a light post in the parking lot and/or other such locations, and be directed at a cart corral in the parking lot. The cart corral is at a predefined location, and may include one or more structures (e.g., railings, barriers, base plates, etc.), where customers place the item containers (e.g., shopping carts) when they are finish using them. The use of the directional antennas limits the detected sound that is evaluated. As another example, one or more microphones may be placed on or adjacent a cart corral. In some applications, the audio detectors may include one or more filters and/or are configured to detect sounds within limited frequency ranges to further limit the scope and/or quantity of sounds considered. Some embodiments use multiple microphones placed at different locations. The cooperative use of multiple audio detectors allows the audio evaluation circuit and/or control circuit to identify and/or estimate a location where the audio signal is detected. For example, triangulation can be used when two or more audio detectors detect the same audio signal. Sounds can be used to triangulate the location based on a number of microphones capturing the sounds. For example, microphones can be directed at multiple different locations and capturing sounds at the multiple locations. The different microphones could capture the sound at different times, and thus be used to determine a location where the sound occurred. Audio detectors may further capture audio signals generated by noise makers on the item containers. Further, the noise makers may allow identification and/or distinction of different item containers. A power source can be included in the noise maker, powered by wheel movement, or the like.

In many instances, multiple different areas of a parking lot and/or other areas of the shopping facility and/or associated with the shopping facility may be of interest. Some embodiments may use one or more audio detectors that are configured to detect audio signals from multiple of these areas. Additionally or alternatively, some embodiments may use one or more audio detectors to detect audio signals from a single area. Accordingly, some embodiments include one or more audio detectors positioned relative to a parking lot and/or other predefined locations associated with a shopping facility, and the audio detectors capture audio signals generated at one or more predefined locations. In some applications, the audio detectors may continuously capture audio. One or more audio detectors may additionally or alternatively capture limited sounds, such as above a determined volume threshold, have a component within one or more given frequency ranges, and/or the like. Similarly, the detection and/or recording of the audio signals can continue for a predefined period of time in response to a signal being within the frequency ranges and/or above a threshold volume, until an audio signal drops below a threshold volume, interference and/or distortion exceeds a threshold, and/or other such factors.

The one or more audio evaluation circuits 104 are communicatively coupled with one or more of the audio detectors, and receive over time the audio signals captured by the one or more audio detectors. The audio signals are processed and/or evaluated to identify, for each of the audio signals, when the audio signal includes one or more audio signatures that correspond to one or more distinct predefined audio signatures that correspond to movements of one or more item containers relative to at least one predefined location of the parking lot or other area. The signal processing can include filtering, band limiting, amplification, analog to digital conversion, transforming (e.g., Fourier transforms), other such processing, or a combination of two or more of such processing.

The evaluation in some embodiments can include determining whether a sound signature of a detected and/or recorded audio signal has a frequency range and/or a spectral content that is within thresholds of one or more predefined frequency ranges in determining whether the item container has been placed into a predefined location (e.g., a corral in a parking lot). In some embodiments, for example, one or more types of Fourier transforms and/or other such transforms may be applied to a detected audio signal and frequency ranges of one or more peaks may be identified, and/or a series of frequency ranges may be identified as a frequency signature corresponding to an audio signal with one or more sounds, and typically a sequence of sounds. The one or more frequency ranges and/or frequency signatures of the one or more audio signals can be compared to one or more predefined frequency ranges, sequence of ranges, and/or frequency signatures in evaluating the audio signature to determine whether a detected audio signal corresponds to predefined audio signal (e.g., within a threshold frequency range of the predefined audio signal).

The predefined audio signatures may be one or more predefined frequency bands, frequency ranges or the like. In some implementations, the predefined audio signatures can be captured at known times when inducing known sounds, such as pushing one or more shopping carts over a crossbarrier of a corral, pushing one or more carts into an interior side of a corral, pushing a cart to nest with one or more other carts, pushing a cart to nest with one or more other carts within a corral, one or more carts being removed from a corral, one or more bells or other predefined noise makers that are activated in response to an item container contacting a part of a corral, button or the like, other such predefined audio signatures, combinations of such audio signatures, and/or sequences of two or more of such audio signatures. The predefined audio signals can be similarly processed to obtain the predefined frequency signatures, predefined frequency ranges and the like.

One or more threshold variations from the predefined frequency signatures and/or frequency ranges can further be defined such that detected signatures that are within the threshold of the frequency signatures and/or ranges are typically also considered to correspond to the predefined audio signals. A frequency and/or frequency range can be determined for a predefined audio signal and/or of a distinct sound. In some embodiments, audio signals that include one or more sounds within a threshold can be considered a match to the predefined sound with some distortion. The distortion can be caused by various different affects, such as but not limited to weather, dirt build-up (e.g., dirt may lower the frequency and making the signal have more bass), changes in physical characteristics (e.g., a corral could have a dent causing generated sound from contact to move in the treble direction), degradation over time, damage to wheels and/or bearings, and other such effects. Accordingly, embodiments typically evaluate the detected audio signatures in determining whether the detected audio signatures and/or portions of audio signatures are within threshold variations of predefined audio signatures. Additionally or alternatively, detected audio signatures can be evaluated relative to known prerecorded audio signatures that correspond to movements of one or more item containers relative to one or more predefined locations associated with the shopping facility (e.g., a parking lot, an entrance to a shopping facility, a planter, etc.).

The control circuit 106 couples with the audio evaluation circuit 104 and receives the output of the evaluation of the audio signals. In some instances, the audio evaluation circuit notifies the control circuit when a match is detected between a detected audio signal and a predefined audio signature. The match can indicate, for example, that an item container is being pushing into a cart corral, that an item container is being nested with one or more other item containers, that multiple item containers are being removed from a corral, that multiple nested item containers are being pushed together toward a shopping facility item container staging area, that an item container is being pushed out of a door or away from a shopping facility (e.g., a walkway may include a series of bumps, depressions or the like that induce a sequence of sounds that can be detected, with the sequence identifying a direction of movement), and/or other such conditions.

The control circuit can estimate a quantity of item containers at the one or more predefined locations, quantity of item containers removed from the shopping facility, quantity of item containers that have been returned to the shopping facility, and the like, as a function of identifying that one or more of the audio signals include one or more audio signatures corresponding to the one or more predefined audio signatures. The control circuit and/or another control system may further utilize this quantity information. In some embodiments, for example, the control circuit can estimate a number of item containers that are out in a parking lot that need to be retrieved by one or more workers. Based on a known total number of item containers the control circuit can determine when and/or whether one or more workers should be tasked to retrieve item containers. In some embodiments, the control circuit identifies that the estimated quantity of item containers at the one or more predefined locations of the parking lot and/or other areas is greater than a threshold quantity. In response to the quantity of item containers being greater than the threshold quantity, the control circuit can notify one or more workers of the shopping facility to retrieve the item containers. In some embodiments, the control circuit can communicate a task message to one or more user interface units 122 (e.g., smart phones, tablets, optical head-mounted display systems, smart watch systems, shopping facility specific wireless communication devices, scanning devices, and other such consumer electronic user devices), a notification can be displayed on one or more work displays of work terminals and/or POS systems, printed to paper, and/or other such notification. Workers may additionally acknowledge the task is completed (e.g., through a user interface unit, pressing a predefined button at an item container staging area, etc.).

Additionally or alternatively, the notification can be directed to the task system 120. The task system can evaluate tasks currently assigned to one or more workers and identify one or more workers of the plurality of workers at the shopping facility and/or scheduled to be at the shopping facility that should be assigned the retrieval task and/or when the retrieval should take place. Again, notification can be a wireless communication to a user interface unit 122, displayed on a display that is visible to workers, and/or other such notifications.

Some embodiments further confirm that one or more workers have retrieved the item containers. The audio evaluation circuit may further receive one or more additional audio signals captured by the audio detector after one or more workers are notified to retrieve item containers. The audio evaluation circuit can identify, from the additional audio signal, one or more additional audio signatures corresponding to one or more predefined additional audio signatures that correspond to movements of a plurality of item containers being moved toward the shopping facility. Again, the movement toward the shopping facility can include audio signatures with predefined frequency ranges, a sequence of audio signatures with predefined frequency ranges, audio signatures that are similar to prerecorded audio signatures, audio signatures with predefined frequency ranges and that over time increase and/or decrease in volume as the item containers are moved toward or away from one or more audio detectors, and the like.

The control circuit 106 can confirm, based on the identification of the one or more additional audio signatures corresponding to one or more predefined additional audio signatures, that at least a portion of the estimated quantity of the item containers at the one or more predefined locations are returned to the shopping facility. The quantity may be estimated based on detected volume, differences in frequency ranges corresponding to known numbers of item containers, predefined sounds generated by each item container approaching a staging area proximate an entrance to the shopping facility (e.g., wheels passing over one or a sequence of bumps, depressions or the like), and other such factors of the detected audio signatures. In some instances, the control circuit may notify the task system to remove the task and/or update the task (e.g., based on identifying that one or more item containers were retrieved from a first predefined location but not a second predefined location, based on an estimated number of item containers retrieved, and the like).

In some embodiments, the control circuit further distinguishes a first predefined location where an item container is placed (or removed) from one or more other different predefined locations based on the detected sound. Accordingly, the control circuit 106 determines an estimated first quantity of item containers at a first predefined location, based on a first set of the one or more audio signatures that are determined to correspond to the one or more predefined audio signatures that are associated with the first predefined location, are detected by one or more audio detectors associated with the first predefined location, and the like. Similarly, the control circuit can distinguish item containers placed at or removed from a first predefined location from one or more item containers being placed and/or removed from a second predefined location. Further, the control circuit can estimate a second quantity of item containers at a second predefined location, a third quantity at a third predefined location, and the like. Further, the estimations at each of the different locations may be based on separate sets of one or more audio signatures corresponding to separate sets of one or more predefined audio signatures that associated with the different predefined locations (e.g., a second set of one or more predefined audio signatures associated with a second predefined location, a third set of one or more predefined audio signatures associated with a third location, etc.), the sets of one or more audio signatures being detected from sets of one or more audio detectors associated with the different predefined locations, and the like. The control circuit may additionally or alternatively evaluate estimated quantities of item containers at one or more specific predefined locations relative to respective quantity thresholds corresponding to the different predefined locations. As such, the control circuit in causing one or more workers to be notified and/or setting one or more tasks to retrieve item containers may further cause the one or more workers to be notified and/or tasked to specifically retrieve the item containers from a first predefined location based on the estimated quantity of item containers at the first predefined location having a predefined relationship with a corresponding first predefined location quantity threshold.

As described above, some embodiments determine and/or confirm an item container location based on a combination of multiple audio signatures. The audio evaluation circuit 104, in some applications, may identify that multiple detected audio signatures each correspond to a different predefined audio signature. The control circuit and/or audio evaluation circuit may further evaluate the detected audio signatures and identify that the multiple audio signatures occurred within a threshold period of time and/or the multiple detected audio signatures occurred in a sequence consistent with a predefined sequence of predefined audio signatures. When the multiple detected audio signatures that correspond to multiple predefined audio signatures occurred within the threshold period of time of each other and/or occurred in accordance with the predefined sequence, the control circuit may designate that an item container is placed at a first predefined location area of one or more predefined locations, that an item container is removed from a first predefined location area, that multiple item containers are placed or removed from a first predefined location area, that multiple item containers are moved in a determined direction, or other such designation that corresponds to one of multiple different sequences of predefined audio signatures. The sequence of detected audio signatures can further be used to determine a direction of movement of the item containers. For example, when a first audio signature corresponds to wheels of a shopping cart contacting a base or stop rail of a corral and a subsequent second audio signature corresponding to the shopping cart contacting a rail of the corral, the sequence indicates that the shopping cart is being placed into the corral verses being removed from the corral. It is noted that the control system may decrease an estimated number of item containers in response to detecting that an item container is removed from a predefined location and/or moved along one or more predefined portions of the parking lot and/or toward the entrance of the shopping facility.

Some embodiments further interpret audio and/or sound signatures in a particular sequence. The sequence of the audio signatures are then used to determine whether one or more item containers are placed in one or more predefined locations and/or pulled out of one or more predefined locations based on the sequence order. For example, when the system detects a shopping cart rolling over the cart entrance of a corral, a staging area or the like, followed by the shopping cart impacting into the corral or into another shopping cart, the system can recognize the detected audio signatures and the sequence of the audio signatures as corresponding to a shopping cart being pushed into the corral, and thus can increase the count of estimated item containers at the corral.

Similarly, in some embodiments, one or more predefined audio signatures may correspond to an item container contacting one or more predefined structures and/or elements at the predefined locations, and thus generating a known audio signature. The audio evaluation can identify, in one or more audio signals, one or more detected audio signatures that correspond to a set of one or more predefined audio signatures of an item container contacting one or more predefined structures positioned at one of the one or more predefined locations of the parking lot. For example, a set of one or more predefined audio signatures may correspond to wheels sequentially contacting a base support of a cart corral, a set of one or more predefined audio signatures may correspond to a side of an item container contacting a rail of a cart corral, and other such contact with one or more other structures, an predefined audio sound (which may be outside of human range of hearing) may be generated in response to an item container contacting a structure that triggers a button push at the structure (e.g., wheels passing over a base that causes a button to be pressed, or combination of such predefined signatures corresponding to contact with structures. Further, different structures at different locations may be configured to generate different sounds and/or sounds at different pitches resulting in different audio signatures when an item container contacts similar structures at different locations. For example, two cart corrals may have similar shapes but with one or more different structural features, such as one or more railings and/or a base plate at a first cart corral may have first predefined dimensions (e.g., a first diameter with a first thickness), and one or more railings and/or a base plate at a second cart corral may have second predefined dimensions that are different than the first predefined dimensions. These different features cause a different sound and/or pitch to be generated when an item container contacts these different structural features. As such, the audio evaluation circuit and/or control circuit can distinguish between the different cart corrals based on the different audio signatures.

Some embodiments further include modifying and/or updating predefined audio signatures over time. For example, the sounds generated in response to an item container contacting a cart corral may change over time, based on dents, bends, wear, movement, and the like. As such, the audio evaluation circuit and/or control circuit may track over time changes in one or more detected audio signatures relative to one or more predefined signatures that the audio evaluation circuit and/or the control circuit associate with a first predefined location (e.g., the detected audio signature corresponds within a margin of error of the predefined audio signature associated with the first predefined location). Based on the detected change over time, the predefined audio signature may be modified and/or one or more additional predefined audio signatures may be added to the set of one or more predefined audio signatures that correspond to the corresponding predefined location. In some embodiments, the control circuit identifies when a threshold number of detected audio signatures that are associated with a first predefined location have a threshold similarity to each other and/or consistent difference relative to a predefined audio signature corresponding to the first predefined location, the control circuit may modify and/or add one or more predefined audio signatures. Similarly, the detection of audio signatures over a threshold period of time that are associated with a first predefined audio signature and have the determined consistent difference to the first predefined audio signature and/or the detected audio signatures have a threshold consistency over that threshold period of time, the control circuit and/or audio evaluation circuit may modify and/or update the one or more corresponding predefined audio signatures.

In some embodiments, the control circuit 106 may receive additional input from one or more other sources that can be used in estimated and/or adjusting estimates of a number of item containers that are at predefined locations and/or have been removed from the shopping facility. In some instances, for example, the one or more POS systems 112 may communicate information to the control circuit 106 regarding completions of sales and/or number of products in the completed sale. The control circuit can activate one or more audio detectors in response to receiving the notification of a completed sale. The activation may be delayed from the notification based on an estimated time for a customer to exit the shopping facility and/or to unload the products and place the item container in a predefined location area. Additionally or alternatively, the control circuit may determine, based on the completed sales and/or number of products in a completed sale, the number of item containers that customers are likely to have removed from the shopping facility. This estimated number can be used as a verification of estimated item containers, and/or to adjust estimated numbers.

Additional information may be provided to the control circuit 106 from the inventory system 114 based on tracked sales and/or quantities of product predicted to be leaving the shopping facility. The control circuit may use this information in estimating the number of item containers used and/or removed from the shopping facilities. This product information may further be considered in relation to POS system information in estimating numbers of item containers removed from the shopping facility.

Figure 3:
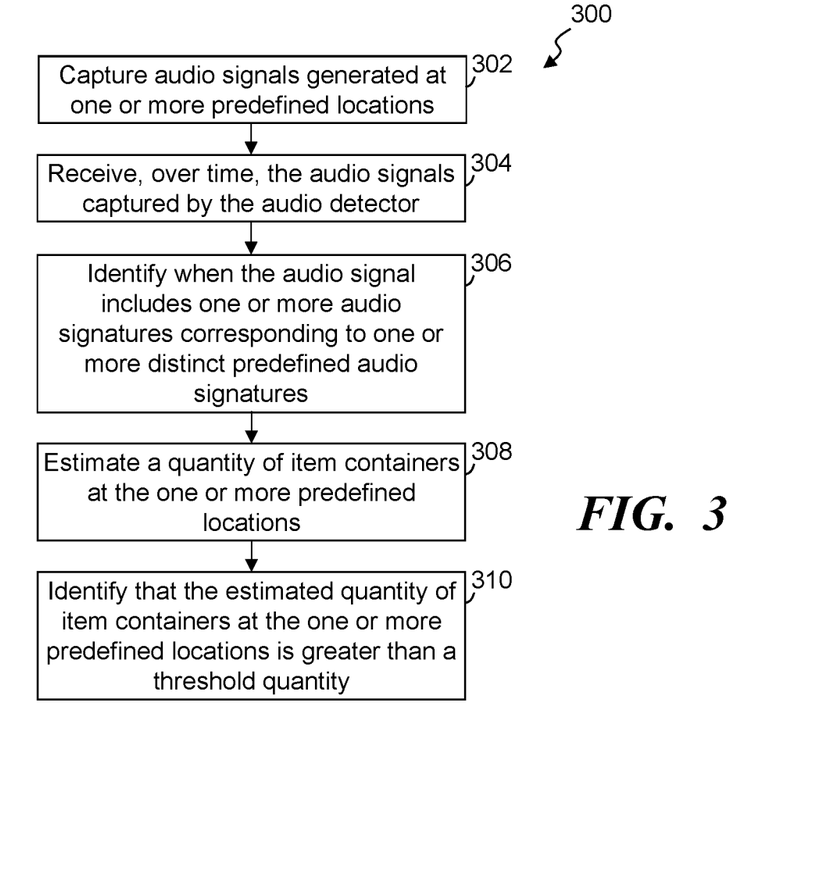
FIG. 3 illustrates a simplified flow diagram of an exemplary process of tracking and/or estimating a number of item containers, in accordance with some embodiments.

FIG. 3 illustrates a simplified flow diagram of an exemplary process 300 of tracking and/or estimating a number of item containers, in accordance with some embodiments. In step 302, one or more audio signals generated at one or more predefined locations of a parking lot are captured through an audio detector 102 positioned relative to the parking lot associated with a shopping facility. The audio detectors may be positioned at the predefined locations, remote from the predefined locations, or combination thereof. Some embodiments utilize multiple audio detectors to capture audio signals at one predefined location.

In step 304, the audio signals captured by the one or more audio detectors are received over time through one or more audio evaluation circuits 104. In step 306, each of the audio signals is evaluated to identify when one or more of the audio signals includes one or more audio signatures corresponding to one or more distinct predefined audio signatures that correspond to movements of one or more item containers relative to the one or more predefined locations of the parking lot.

In step 308, a quantity of item containers at one or more of the predefined locations is estimated as a function of identifying that one or more of the audio signals include one or more audio signatures corresponding to the one or more predefined audio signatures. Some embodiments may further include step 310, where it is identified that the estimated quantity of item containers at the one or more predefined locations of the parking lot is greater than a threshold quantity, and one or more workers of the shopping facility are notified to retrieve the item containers in response to the estimated quantity of item containers being greater than the threshold quantity.

Some embodiments may further confirm the one or more workers retrieved the carts. One or more additional audio signals captured by the audio detector may be received (e.g., and the audio evaluation circuit 104) after notifying the one or more workers to retrieve item containers. One or more additional audio signatures may be identifying, from the additional audio signal, that correspond to one or more predefined additional audio signatures that correspond to movements of a plurality of item containers being moved toward the shopping facility. A confirmation can be generated, based on the identification of the one or more additional audio signatures corresponding to one or more predefined additional audio signatures, that at least a portion of the estimated quantity of the item containers at the one or more predefined locations are returned to the shopping facility.

Some embodiments further distinguish between different locations based on the detected audio signals. The estimation of the quantity of item containers can include estimating, based on a first set of the one or more audio signatures corresponding to one or more predefined audio signatures, a first quantity of item containers at a first predefined location and a second quantity of items at a second predefined location. When notifying one or more workers, the system can notify the workers to specifically retrieve the item containers from specific one or more locations (e.g., the first predefined location) based on the estimated quantity of item containers at the specific predefined location.

Again, sequences of audio signatures can be used to identify where item containers are deposited and/or a direction of movement of item containers. The system may identify that each of multiple detected audio signatures correspond to a different one of a set of predefined audio signatures. A first item container may be designated as being placed at a first predefined location area based on a confirmation that a sequence of the occurrence in time of the multiple audio signatures relative to each other correspond to a predefined sequence of the set of predefined audio signatures. Some embodiments further identify, in a first audio signal, a first audio signature that corresponds to a first predefined audio signature of an item container contacting one or more predefined structures positioned at one of the one or more predefined locations of the parking lot.

In some embodiments, a determined location of an item container may be confirmed based on a combination of multiple signatures. The system can identify that multiple audio signatures of one or more of the audio signals each correspond to a different predefined audio signature. It can be identified that the multiple audio signatures occurred within a threshold period of time. For example, an evaluation of a time detected of the multiple audio signatures can identify that the multiple audio signatures were detected within a threshold amount of time of each other. Additionally or alternatively, it can be identified that the multiple audio signatures occurred in a sequential order that is consistent with a predefined sequence of multiple predefined audio signatures. The first item container can be designated as being placed at the first predefined location area in response to the combination of multiple audio signals occurring within the threshold period of time and/or occurring in accordance with the predefined sequence. As introduced above, the audio detectors may include one or more microphones, one or more arrays of microphones, omni-directional microphones, directional microphones, frequency spectrum detectors, and/or other such detectors. For example, some embodiments mount one or more directional antennas at a distance from one or more predefined locations of the parking lot and directed at a first predefined location of the one or more predefined locations where item containers are deposited. At least some of the audio signals generated at the first predefined location are captured by a directional antenna.

Figure 4:
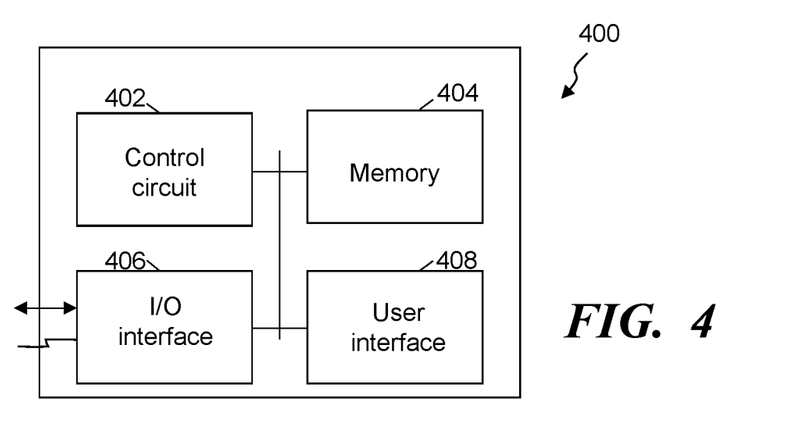
FIG. 4 illustrates an exemplary system for use in implementing systems, apparatuses, devices, methods, techniques and the like in controlling the delivery of products in accordance with some embodiments.

The methods, techniques, systems, devices, services, servers, sources and the like described herein may be utilized, implemented and/or run on many different types of devices and/or systems. Referring to FIG. 4, there is illustrated an exemplary system 400 that may be used for any such implementations, in accordance with some embodiments. One or more components of the system 400 may be used to implement any system, apparatus or device mentioned above or below, or parts of such systems, apparatuses or devices, such as for example any of the above or below mentioned audio detectors 102, audio evaluation circuits 104, control circuit 106, POS systems 112, inventory system 114, task system 120, user interface units 122, and the like. However, the use of the system 400 or any portion thereof is certainly not required.

By way of example, the system 400 may include one or more system control circuits 402, memory 404, and input/output (I/O) interfaces and/or devices 406. Some embodiments further include one or more user interfaces 408. The system control circuit 402 typically comprises one or more processors and/or microprocessors. The memory 404 stores the operational code or set of instructions that is executed by the system control circuit 402 and/or processor to implement the functionality of the audio detectors 102, audio evaluation circuits 104, control circuit 106, POS systems 112, inventory system 114, task system 120, user interface units 122, and the like. In some embodiments, the memory 404 may also store some or all of particular data that may be needed to detect audio signals, evaluate the audio signals, distinguish locations, estimate quantities, and make any of the detections, associations, determinations, measurements and/or communications described herein. Such data may be pre-stored in the memory, received from an external source, be determined, and/or communicated to the system.

It is understood that the system control circuit 402 and/or processor may be implemented as one or more processor devices as are well known in the art. Similarly, the memory 404 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 404 is shown as internal to the system 400; however, the memory 404 can be internal, external or a combination of internal and external memory. Additionally, the system typically includes a power supply (not shown), which may be rechargeable, and/or it may receive power from an external source. While FIG. 4 illustrates the various components being coupled together via a bus, it is understood that the various components may actually be coupled to the system control circuit 402 and/or one or more other components directly.

Generally, the system control circuit 402 and/or electronic components of the system 400 can comprise fixed-purpose hard-wired platforms or can comprise a partially or wholly programmable platform. These architectural options are well known and understood in the art and require no further description here. The system and/or system control circuit 402 can be configured (for example, by using corresponding programming as will be well understood by those skilled in the art) to carry out one or more of the steps, actions, and/or functions described herein. In some implementations, the system control circuit 402 and the memory 404 may be integrated together, such as in a microcontroller, application specification integrated circuit, field programmable gate array or other such device, or may be separate devices coupled together.

The I/O interface 406 allows wired and/or wireless communication coupling of the system 400 to external components and/or or systems. Typically, the I/O interface 406 provides wired and/or wireless communication (e.g., Wi-Fi, Bluetooth, cellular, RF, and/or other such wireless communication), and may include any known wired and/or wireless interfacing device, circuit and/or connecting device, such as but not limited to one or more transmitter, receiver, transceiver, etc.

The user interface 408 may be used for user input and/or output display. For example, the user interface 408 may include any known input devices, such one or more buttons, knobs, selectors, switches, keys, touch input surfaces, audio input, and/or displays, etc. Additionally, the user interface 408 include one or more output display devices, such as lights, visual indicators, display screens, etc. to convey information to a user, such as but not limited to item container quantity information, predefined location information, modification information related to the modification and/or addition of predefined audio signatures, status information, notifications, errors, conditions, and/or other such information. Similarly, the user interface 408 in some embodiments may include audio systems that can receive audio commands or requests verbally issued by a user, and/or output audio content, alerts and the like.

Some embodiments further include one or more microphones, arrays of microphones, and the like. Still further, some embodiments may include sensors and/or sensor systems, such as but not limited to inertial detection systems, signal strength detection systems, movement detectors, optical sensors, bar code readers, and the like.

The availability of item containers for customer use can have an effect on customer satisfaction and sales at a shopping facility. Typically, a manager or associate choosing a time to go get carts, which may be based on customer feedback. Present embodiments, in part, provide a systematic approach to improve efficiency and customer experience. Some embodiments include one or more audio detectors (e.g., microphone, microphone array, etc.) that can be placed at predefined locations and/or away from predefined locations (e.g., a cart corral) in parking lot, and in cart staging and/or storage areas, which are typically at the entrance of the shopping facility. The audio detectors and/or sensor are communicatively coupled to a system control circuit 106 or server, that uses input from an audio evaluation circuit 104 to detect distinct audio signatures and/or sound that one or more item containers makes when placed in the corral area, removed from a corral area, removed from a cart storage or staging area, returned to a staging area, and/or other predefined locations. The control circuit can estimate a quantity of item containers at one or more of the predefined locations. This count can be used to schedule one or more tasks to retrieve item containers from one or more of the predefined locations. Further, in some embodiments, the control circuit 106 may further consider additional information and/or paired the audio signature evaluation and/or estimated quantities with other data, such as but not limited to sales, door openings, item contain removals from a staging area, and/or other such data to determine an optimal time for cart retrieval.

In some embodiments, systems, apparatuses and methods track item containers associated with a shopping facility. Some embodiments, provide systems to track item containers, comprising: an audio detector positioned relative to a parking lot associated with a shopping facility and configured to capture audio signals generated at one or more predefined locations of the parking lot; an audio evaluation circuit configured to: receive, over time, the audio signals captured by the audio detector; and identify, for each of the audio signals, when the audio signal includes one or more audio signatures corresponding to one or more distinct predefined audio signatures that correspond to movements of a first item container relative to the one or more predefined locations of the parking lot; and a control circuit coupled with the audio evaluation circuit and configured to estimate a quantity of item containers at the one or more predefined locations as a function of identifying that one or more of the audio signals include the one or more audio signatures corresponding to the one or more predefined audio signatures.

Some embodiments provide methods of tracking item containers, comprising: capturing, through an audio detector positioned relative to a parking lot associated with a shopping facility, audio signals generated at one or more predefined locations of the parking lot; receiving, over time through an audio evaluation circuit, the audio signals captured by the audio detector; identifying, for each of the audio signals, when the audio signal includes one or more audio signatures corresponding to one or more distinct predefined audio signatures that correspond to movements of a first item container relative to the one or more predefined locations of the parking lot; and estimating a quantity of item containers at the one or more predefined locations as a function of identifying that one or more of the audio signals include the one or more audio signatures corresponding to the one or more predefined audio signatures.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system to track item containers, comprising:
a plurality of audio detectors positioned relative to a parking lot associated with a shopping facility and configured to capture audio signals generated at one or more predefined locations of the parking lot;
an audio evaluation circuit configured to:
receive, over time, the audio signals captured by the plurality of audio detectors; and
identify, for each of the audio signals, when the audio signal includes one or more separate audio signatures captured over time and corresponding to one or more distinct predefined audio signatures that correspond to movements of a non-damaged first item container relative to the one or more predefined locations of the parking lot; and
a control circuit coupled with the audio evaluation circuit and configured to estimate a quantity of item containers at the one or more predefined locations as a function of identifying that one or more of the audio signals include the one or more audio signatures corresponding to the one or more predefined audio signatures;

wherein the audio evaluation circuit is further configured to identify that each of multiple audio signatures correspond to a different one of a first set of predefined audio signatures associated with movement of non-damaged wheels of item containers;

wherein the control circuit is further configured to confirm that the first item container is placed at a first predefined location area based on a confirmation that a sequence of the occurrence in time of the multiple audio signatures relative to each other correspond to a predefined sequence of the first set of predefined audio signatures; and wherein the control circuit, in confirming the first item container is placed at the first predefined location area, is configured to triangulate a location of a source of each of at least one audio signal captured by each of at least two different audio detectors of the plurality of audio detectors based on the audio signals from the at least two of the plurality of audio detectors.

2. The system of claim 1, wherein the control circuit is further configured to:

identify that the estimated quantity of item containers at the one or more predefined locations of the parking lot is greater than a threshold quantity; and notify one or more workers of the shopping facility to retrieve the item containers in response to the estimated quantity of item containers being greater than the threshold quantity.

3. The system of claim 2, wherein the audio evaluation circuit is further configured to:

receive, after the notifying the one or more workers, one or more additional audio signals captured by the audio detector; and identify, from the additional audio signal, one or more additional audio signatures corresponding to one or more predefined additional audio signatures that correspond to movements of a plurality of item containers being moved toward the shopping facility; and wherein the control circuit is further configured to confirm, based on the identification of the one or more additional audio signatures corresponding to the one or more predefined additional audio signatures, that at least a portion of the estimated quantity of the item containers at the one or more predefined locations are returned to the shopping facility.

4. The system of claim 2, wherein the control circuit in estimating the quantity of item containers is configured to estimate, based on multiple audio signatures each corresponding to the one or more predefined audio signatures, a first quantity of item containers at a first predefined location and a second quantity of items at a second predefined location; and wherein the control circuit in notifying the one or more workers is configured to notify the one or more workers to specifically retrieve the item containers from the first predefined location based on the estimated quantity of item containers at the first predefined location.

5. The system of claim 1, wherein the audio evaluation circuit in identifying that each of the multiple audio signatures correspond to a different one of the set of predefined audio signatures identifies, in a first audio signal, a first audio signature that corresponds to a first predefined audio signature of an item container contacting one or more predefined structures positioned at the first predefined location of the one or more predefined locations of the parking lot.

6. The system of claim 1, wherein the audio evaluation circuit, in identifying when the audio signal includes one or more audio signatures corresponding to the one or more predefined audio signatures, is further configured to identify that multiple audio signatures of one or more of the audio signals each correspond to a different predefined audio signature;

wherein the control circuit is further configured to:

identify that the multiple audio signatures occurred within a threshold period of time; and confirming that the first item container is placed at a first predefined location area of the one or more predefined locations in response to the combination of the multiple audio signatures occurring within the threshold period of time.

7. The system of claim 1, wherein the audio detector comprises a directional microphone mounted at a distance from the one or more predefined locations of the parking lot and directed at a first predefined location of the one or more predefined locations where item containers are deposited to capture at least some of the audio signals generated at the first predefined location.

8. The system of claim 1 wherein the audio evaluation circuit in identifying, for each of the audio signals, when the audio signal includes one or more audio signatures is configured to identify when the audio signal includes one or more separate audio signatures captured over time and corresponding to one or more distinct predefined audio signatures; and wherein the audio evaluation circuit in identifying that each of the multiple audio signatures correspond to a different one of the set of predefined audio signatures is configured to is further configured to identify that each of multiple separate audio signatures correspond to a different one of a first set of predefined audio signatures of multiple different sets of predefined audio signatures, wherein each of the sets of predefined audio signatures corresponds to a different one of multiple different predefined locations of the shopping facility; and wherein the control circuit is further configured to confirm that the first item container is placed at the first predefined location area based on the confirmation that the sequence of the occurrence in time of the multiple audio signatures relative to each other correspond to the predefined sequence of the first set of predefined audio signatures.

9. The system of claim 8, wherein the audio evaluation circuit is configured to filter the detected the audio signals based on multiple different frequency ranges and obtain from the audio signals the separate audio signatures separated in time relative to each other.

10. The system of claim 9, further comprising: a task system communicatively coupled with the control circuit and configured to receive the quantity information, evaluate tasks currently assigned to a plurality of workers at the shopping facility, and identify one or more workers of the plurality of workers that are to be assigned the retrieval task of retrieving the item containers, identify when the retrieval of the carts should take place, and cause a task notification to be wirelessly communicated to the identified one or more workers that are to be assigned the retrieval task of retrieving the item containers.

11. A method of tracking item containers, comprising:

capturing, through a plurality of audio detectors positioned relative to a parking lot associated with a shopping facility, audio signals generated at one or more predefined locations of the parking lot;
receiving, over time through an audio evaluation circuit, the audio signals captured by the plurality of audio detectors;
identifying, for each of the audio signals, when the audio signal includes one or more separate audio signatures captured over time and corresponding to one or more distinct predefined audio signatures that correspond to movements of a first item container relative to the one or more predefined locations of the parking lot;
estimating a quantity of item containers at the one or more predefined locations as a function of identifying that one or more of the audio signals include the one or more audio signatures corresponding to the one or more predefined audio signatures;
identifying that each of multiple audio signatures correspond to a different one of a first set of predefined audio signatures associated with movement of non-damaged wheels of item containers; and
confirming that the first item container is placed at a first predefined location area based on a confirmation that a sequence of the occurrence in time of the multiple audio signatures relative to each other correspond to a predefined sequence of the first set of predefined audio signatures;
wherein the confirming the first item container is placed at the first predefined location area comprises triangulating a location of a source of each of at least one audio signal captured by each of at least two different audio detectors of the plurality of audio detectors based on the audio signals from the at least two of the plurality of audio detectors.

12. The method of claim 11, further comprising:
identifying that the estimated quantity of item containers at the one or more predefined locations of the parking lot is greater than a threshold quantity; and
notifying one or more workers of the shopping facility to retrieve the item containers in response to the estimated quantity of item containers being greater than the threshold quantity.

13. The method of claim 12, further comprising:
receiving, after the notifying the one or more workers, one or more additional audio signals captured by the audio detector; and
identifying, from the additional audio signal, one or more additional audio signatures corresponding to one or more predefined additional audio signatures that correspond to movements of a plurality of item containers being moved toward the shopping facility; and
confirming, based on the identification of the one or more additional audio signatures corresponding to the one or more predefined additional audio signatures, that at least a portion of the estimated quantity of the item containers at the one or more predefined locations are returned to the shopping facility.

14. The method of claim 12, wherein the estimating the quantity of item containers further comprises estimating, based on multiple audio signatures each corresponding to the one or more predefined audio signatures, a first quantity of item containers at a first predefined location and a second quantity of items at a second predefined location; and
wherein the notifying the one or more workers comprises notifying the one or more workers to specifically retrieve the item containers from the first predefined location based on the estimated quantity of item containers at the first predefined location.

15. The method of claim 11, wherein the identifying that each of the multiple audio signatures correspond to a different one of the set of predefined audio signatures comprises identifying, in a first audio signal, a first audio signature that corresponds to a first predefined audio signature of an item container contacting one or more predefined structures positioned at the first predefined location of the one or more predefined locations of the parking lot.

16. The method of claim 11, wherein the identifying when the audio signal includes one or more audio signatures corresponding to the one or more predefined audio signatures further comprises identifying that multiple audio signatures of one or more of the audio signals each correspond to a different predefined audio signature;
identifying that the multiple audio signatures occurred within a threshold period of time; and
confirming that the first item container is placed at a first predefined location area of the one or more predefined locations in response to the combination of the multiple audio signatures occurring within the threshold period of time.

17. The method of claim 11, further comprising:
mounting a directional microphone at a distance from the one or more predefined locations of the parking lot and directed at a first predefined location of the one or more predefined locations where item containers are deposited;
wherein the capturing the audio signals comprises capturing at least some of the audio signals generated at the first predefined location.

18. The system of claim 1, wherein the control circuit is further configured to determine a direction of movement of one or more of the item containers based the sequence of the multiple audio signatures.

19. The system of claim 1, wherein the control circuit is further configured to confirm that the multiple detected audio signatures that correspond to multiple predefined audio signatures occurred within the threshold period of time of each other.

20. The system of claim 1, wherein the control circuit is further configured to identify that the first item container is a first predefined location based on a confirmation that a sequence of the occurrence in time of the multiple audio signatures relative to each other correspond to a predefined sequence of the set of predefined audio signatures.

* * * * *

UNITED STATES PATENT AND TRADEMARK OFFICE
CERTIFICATE OF CORRECTION

PATENT NO. : 10,229,699 B2
APPLICATION NO. : 15/364881
DATED : March 12, 2019
INVENTOR(S) : Jones et al.

Page 1 of 1

It is certified that error appears in the above-identified patent and that said Letters Patent is hereby corrected as shown below:

In the Claims

Column 16, Line 34, Claim 8, delete the first instance of "is further configured to".
Column 18, Line 43, Claim 17, insert --on-- after "based".

Signed and Sealed this
Sixteenth Day of July, 2019

Andrei Iancu
*Director of the United States Patent and Trademark Office*